United States Patent
Schaem (10) Patent No.: US 6,535,634 B1
(45) Date of Patent: Mar. 18, 2003

(54) VIDEO IMAGE COMPRESSION/DECOMPRESSION APPARATUS AND METHOD

(75) Inventor: Stephan D. Schaem, Fair Oaks, CA (US)

(73) Assignee: GlobalStreams, Inc., Clayton, MO (US)

(*) Notice: Subject to any disclaimer, the term of this patent is extended or adjusted under 35 U.S.C. 154(b) by 0 days.

(21) Appl. No.: 09/374,326

(22) Filed: Aug. 13, 1999

(51) Int. Cl.[7] ................................................ G06K 9/00
(52) U.S. Cl. ......................... 382/166; 382/232; 382/238
(58) Field of Search ................................. 382/232, 166, 382/238; 348/415.1, 496

(56) References Cited

U.S. PATENT DOCUMENTS 4,716,453 A * 12/1987 Pawelski ................ 375/240.01
4,912,549 A * 3/1990 Altman et al. ............... 348/496
5,134,476 A * 7/1992 Aravind et al. ............ 348/415.1
5,379,355 A * 1/1995 Allen .......................... 382/238

* cited by examiner

Primary Examiner—Anh Hong Do
(74) Attorney, Agent, or Firm—Thompson Coburn LLP (57) ABSTRACT

A method of compressing a video image comprising a two-dimensional array of pixels, the image being divided into an array of contiguous blocks, the method comprising the steps of: (1) calculating, for each pixel within a block, a difference between a predicted luminance and an actual luminance; (2) assigning a frequency characteristic to the block based on a magnitude of the differences of the pixels within the block; (3) determining, for each pixel within the block, a quantized difference code based on the calculated difference and the assigned frequency characteristic; and (4) storing the frequency characteristic of the block and the quantized difference codes for each pixel within the block; and wherein the step of assigning comprises calculating a sum of the squares of the differences of all pixels within the block, and selecting the frequency characteristic from a set of predetermined frequency characteristics based on the calculated sum.

16 Claims, 9 Drawing Sheets

Compression: $D_c = L_c - (L_a + L_b)/2$

Decompression: $L_c = (L_a + L_b)/2 + D_c$

| -45 | 3 | 22 | -76 | 0 | 14 | 16 | 2 |
|---|---|---|---|---|---|---|---|
| -9 | 54 | -2 | -54 | -7 | -35 | 4 | 76 |
| 44 | 6 | 10 | 14 | -54 | 5 | 5 | 71 |
| -32 | -1 | -30 | 12 | 31 | -15 | 15 | 88 |
| -86 | 1 | 44 | 54 | 12 | -12 | 22 | -9 |
| 55 | -92 | 4 | -13 | -12 | -8 | 32 | -34 |
| -10 | -14 | 76 | 33 | 77 | -9 | -9 | 43 |
| -11 | 2 | 2 | -55 | -32 | 2 | -76 | 33 |

FIG. 8(a)

| 01 | 11 | 11 | 10 | 01 | 01 | 00 | 10 |
|---|---|---|---|---|---|---|---|
| 11 | 11 | 10 | 11 | 00 | 01 | 00 | 11 |
| 01 | 10 | 11 | 11 | 10 | 11 | 00 | 00 |
| 01 | 10 | 11 | 00 | 11 | 01 | 11 | 01 |
| 01 | 00 | 11 | 11 | 01 | 11 | 01 | 01 |
| 11 | 00 | 10 | 00 | 10 | 01 | 00 | 11 |
| 10 | 01 | 00 | 01 | 00 | 11 | 10 | 01 |
| 00 | 10 | 00 | 01 | 10 | 11 | 01 | 00 |

VIDEO IMAGE COMPRESSION/ DECOMPRESSION APPARATUS AND METHOD

CROSS-REFERENCE TO RELATED APPLICATION

This application is related to co-owned U.S. application Ser. No. 09/373,680 by Stephan D. Schaem, entitled "Color Space Conversion System and Method" and filed on Aug. 13, 1999 which is incorporated herein by reference.

BACKGROUND

1. Field of the Invention

The present invention relates generally to computer video image processing, and more particularly to compression and decompression of video images.

2. Description of the Prior Art

Compression of video image data in a computing environment offers several important benefits, including reduction of storage and transmission bandwidth requirements. Numerous techniques are known in the art for compressing and decompressing video image data. One commonly employed compression/decompression technique is embodied in the ISO1172 ("MPEG") standard, which utilizes discrete cosine transforms to achieve compression of pixel luminance and chrominance data.

One disadvantage of MPEG and other prior art video compression/decompression techniques is that they are computationally expensive. Applications implementing prior art video compression/decompression methods in a real-time mode will typically require all available processing cycles of the CPU to execute successfully, thereby preventing concurrent execution of other applications. Further, the high computational requirements of most prior art video compression/decompression techniques necessitate the use of relatively high processing power CPUs to achieve satisfactory performance.

In view of the foregoing, there is a need in the computing art for a video image compression/decompression technique having significantly reduced computational requirements.

SUMMARY OF THE INVENTION

The present invention is directed to a low computational cost apparatus and method for compressing and decompressing video image data. In the compression mode, a color space conversion engine converts video image data to YUV or similar format, wherein each pixel is characterized by a luminance value and two chrominance values. The pixel chrominance data is compressed by any one of a number of well-known low computational cost techniques such as color subsampling.

To compress the luminance data, a difference calculator first calculates, for each pixel, a difference between the actual luminance value and a predicted luminance. The predicted luminance is preferably determined by averaging the luminance values of adjacent pixels. The video image is then divided into an array of contiguous blocks. A block characterization module assigns a frequency characteristic to each block based on the magnitude of the differences within the block. The assigned frequency characteristic is indicative of whether the portion of the image lying within the block contains a number of discontinuous features such as sharp edges (a high frequency block), or whether the image portion within the block is primarily continuous or non-varying (a low frequency block).

A difference quantizer then assigns a quantized difference code to each pixel based on the difference of the pixel and the block frequency characteristic. Each block frequency characteristic (e.g., low frequency, medium frequency, or high frequency) has an associated set of quantized difference values, and each quantized difference value has a quantized difference code corresponding thereto. The difference quantizer is operative to match the pixel difference to the closest quantized difference value, and assign to the pixel the corresponding quantized difference code. In a preferred implementation of the invention, pixel differences are adjusted to compensate for quantization errors of adjacent pixels. The quantized difference codes are stored in a compressed luminance map, and the block frequency characteristics are stored in a block description map.

In the decompression mode, an inverse difference quantizer examines the block description and compressed luminance maps, and determines, for each pixel, a quantized difference value based on the quantized difference code and the block frequency characteristic. A luminance calculator is operative to calculate a recovered luminance from the quantized difference value and the pre-calculated luminances of adjacent pixels. The recovered luminance data is thereafter combined with the separately decompressed chrominance data to reconstruct the video image.

In accordance with the foregoing description, the present invention advantageously provides a video image compression/decompression apparatus and method having relatively low computational requirements, thereby freeing CPU cycles and allowing its execution in a multitasking environment.

DETAILED DESCRIPTION OF A PREFERRED EMBODIMENT

Figure 1:
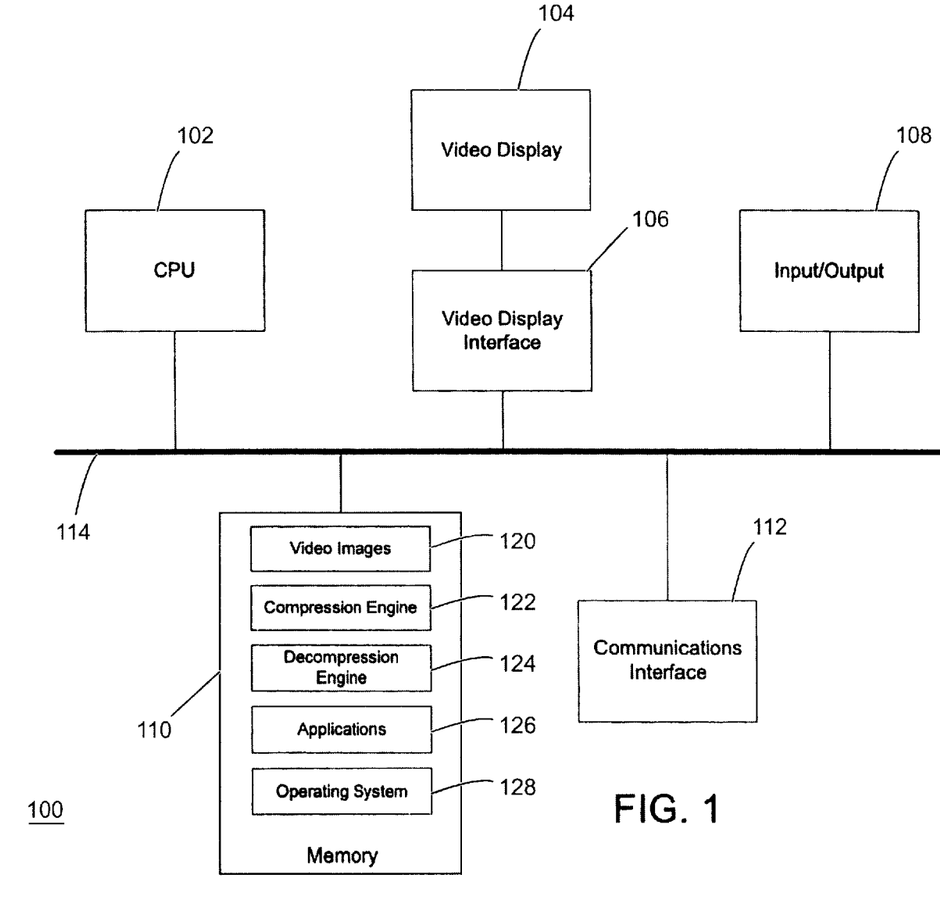
FIG. 1 is a block diagram of a computer device for implementing the present invention.

FIG. 1 depicts a computer device 100 for implementing the video image compression and decompression techniques embodied in the present invention. Computer device 100 includes a central processing unit (CPU) 102, such as an Intel Pentium microprocessor, for executing program instructions. A video display 104, which may comprise a conventional CRT or LCD monitor, is coupled to video display interface 106 and is configured to display images and text to a user. Video display interface 106 may comprise any one of a number of commercially-available video display cards, or may comprise circuitry incorporated into a computer motherboard or CPU 102. Input/output devices 108, which may variously comprise printers, keyboards, mice, trackballs, and the like, are operative to receive information from or convey information to a user or another device.

A memory 110, which may include one or a combination of random access memory (RAM), read-only memory (ROM), or non-volatile storage devices such as magnetic hard disks, CD-ROMs, and magneto-optical drives, stores program instructions, files, and other data. Finally, a communications interface 112, such as a modem or Ethernet card, may be provided to enable communications with one or more remote devices over a network. The various components of computer device 100 are coupled in communication by at least one bus 114.

It is appreciated that computer device 100 may be implemented in any one of a number of forms, including without limitation a personal computer (PC), set-top box (STB), personal digital assistant (PDA) or other handheld device, or an Internet appliance. Other implementations may occur to those of ordinary skill in the art.

As depicted in FIG. 1, memory 110 stores at least one video image 120, a compression engine 122, a decompression engine 124, an application 126, and an operating system (OS)128. OS 128 allocates memory, manages communications between computer device 100 components, and performs other low-level operations. Application 126 will typically comprise a video/multimedia editor, video player, computer game, browser or other type of program which generates, processes and/or displays video images.

The compression and decompression techniques of the present invention are respectively embodied in compression engine 122 and decompression engine 124. Generally, compression engine 122 is operative to encode video images such as to reduce the amount of memory required to store the images, and to enable rapid transmission of the images. Decompression engine 124 is operative to decompress an encoded image for subsequent display. It is to be appreciated that various implementations of the invention may utilize compression engine 122 and decompression engine 124 individually or collectively. It is to be further appreciated that although compression engine 122 and decompression engine 124 are depicted separately from application 126 in FIG. 1, either or both may be integrated into application 126.

Figure 2:
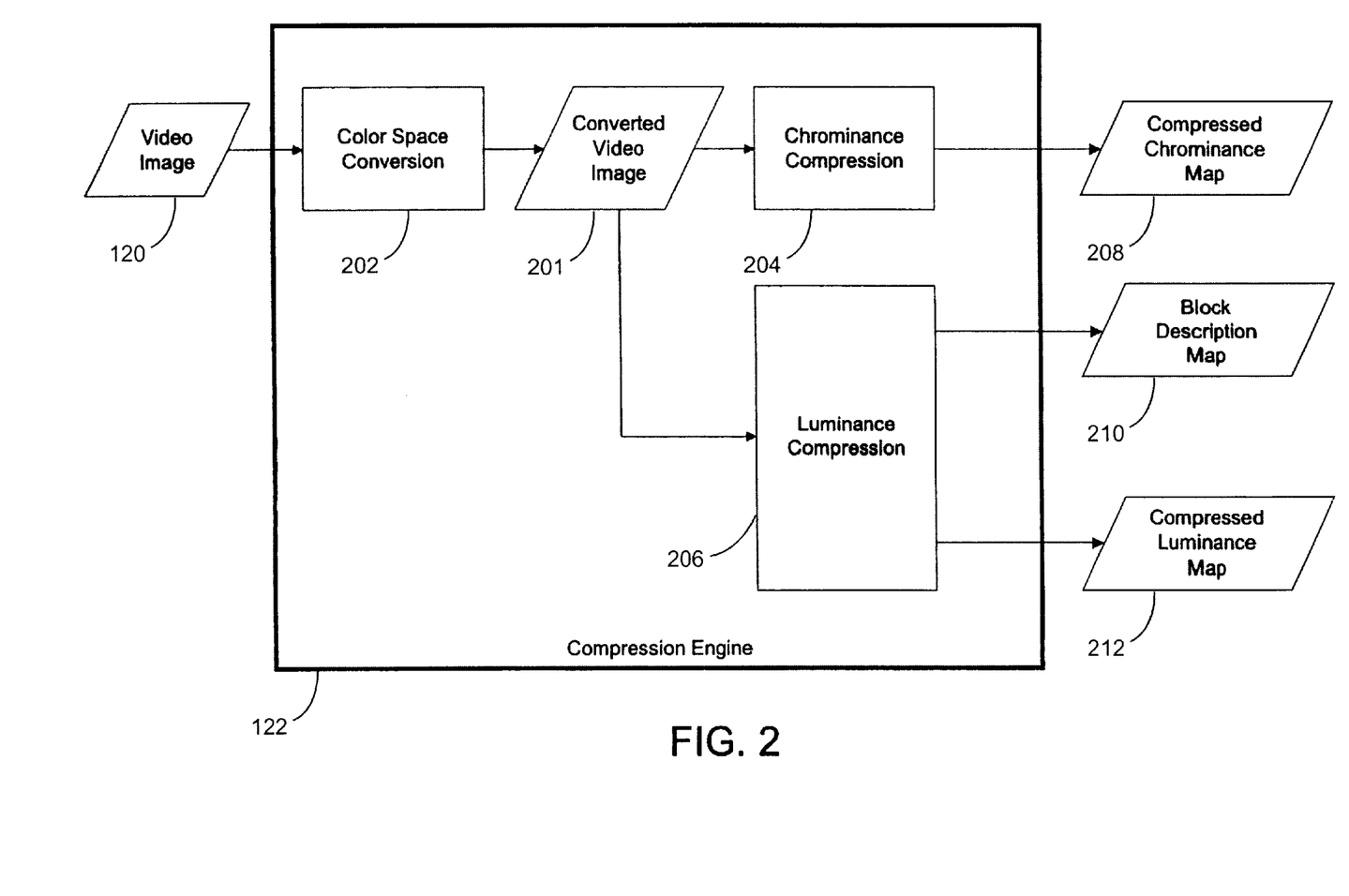
FIG. 2 is a schematic diagram of a compression engine, in accordance with the present invention.

FIG. 2 depicts, in schematic form, components of compression engine 122. Compression engine 202 includes a color space conversion module 204, chrominance compression module 204, and luminance compression module 206. Exemplary video image 120 conventionally comprises a two-dimensional rectilinear array of pixels. Each pixel has associated therewith a set of three values representative of the pixel's luminance (brightness) and chrominance (color). As is known in the art, the pixel luminance and chrominance data can be represented in any one of a number of color spaces, such as the RGB color space.

Color space conversion module 202 is operative to convert the pixel data of video image 120 from an initial color space (typically RGB) to YUV or similar color space wherein the pixel is represented by a luminance value (Y) and two chrominance values (U and V), thereby generating converted video image 201. Color space conversion module 202 may perform the color space conversion by applying well known matrixing operations. Color space conversion module 202 may be omitted if the pixel data is initially coded in YUV or equivalent format.

Compression engine 122 is provided with chrominance compression module 204 and luminance compression module 206 for separate compression of chrominance (UV) and luminance (Y) pixel data. Chrominance compression module 204 may typically apply a well-known, low computation cost compression algorithm to the chrominance data. In a preferred implementation of the invention, chrominance compression module 204 employs a CCIR or bi-directional color subsampling algorithm. Since such methods are known in the art, they need not be described herein. Application of the color subsampling or equivalent algorithm to the pixel chrominance data of video image 201 yields compressed chrominance map 208.

Luminance compression module 206 is configured to apply a luminance compression algorithm of the present invention to the pixel luminance data of video image 120. Application of the luminance compression algorithm to the luminance data yields a block description map 210 and compressed luminance map 212.

Figure 3:
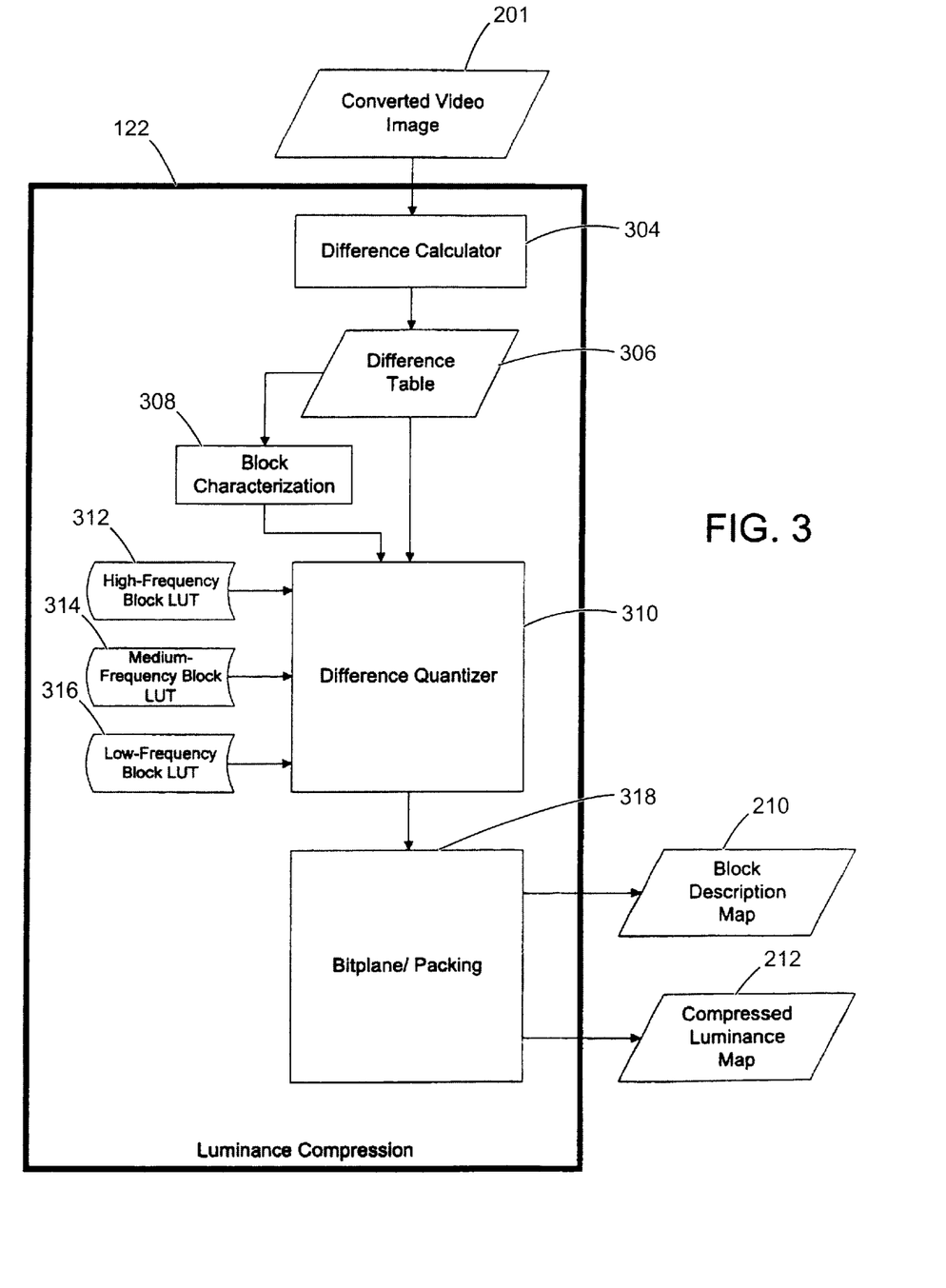
FIG. 3 is a schematic diagram of a luminance compression module of the compression engine.

FIG. 3 presents a schematic depiction of luminance compression module 206. Luminance compression module 206 includes a difference calculator 304, a block characterization module 308, a difference quantizer 310, lookup tables (LUTs) 312, 314, and 316, and bitplane/packing module 318. Difference calculator 304 calculates, for each pixel of color space converted video image 201, a difference between the actual pixel luminance and a predicted luminance, the predicted luminance being calculated by averaging the luminances of two or more adjacent pixels. The calculated differences are then stored in difference table 306. The operation of a preferred implementation of difference calculator 304 is described in further detail below in connection with the FIG. 5 flowchart.

Block characterization module 308 is configured to divide video image 201 into an array of contiguous blocks. In a preferred implementation, each block comprises an 8-by-8 array of pixels. Block characterization module 308 is further configured to assign a frequency characteristic to a selected block based on the magnitude of the differences of the pixels disposed within the selected block. In the preferred implementation, the frequency characteristic may have three values: low, medium and high. The assigned frequency characteristic is generally indicative of the nature of the image portion within the block; specifically, whether or not the image portion includes discontinuities, such as sharp edges. Again, the operation of block characterization module 308 will be described in greater detail in connection with the FIG. 5 flowchart.

Difference quantizer 310 examines the differences held in difference table 306 and determines, for each pixel, a quantized difference code based on the pixel difference and the associated block frequency characteristic. In a preferred embodiment, difference quantizer 310 utilizes LUTs 312, 314 and 316 to determine the quantized difference code. Each value of the frequency characteristic has an LUT uniquely corresponding thereto: LUT 312 is associated with a value of high, LUT 314 is associated with a value of medium, and LUT 316 is associated with a value of low. Each LUT 312, 314 or 316 lists all possible difference values and the corresponding quantized difference codes. In operation, difference quantizer 310 selects a pixel for encoding, reads the pixel difference value, and looks up the corresponding quantized difference code (typically a 2-bit code) in the LUT associated with the block frequency characteristic. Further details regarding difference quantizer 310 are set forth below in connection with FIGS. 5, 8(a) and 8(b).

Bitplane/packing module 318 is configured to store block frequency characteristic data (the frequency characteristic for each block) in block description map 320 and quantized luminance codes for each pixel in compressed luminance map 212. Block description map 210 and compressed luminance map may be stored in bitplane, packed pixel or other suitable form. In a preferred embodiment of the invention, bitplane/packing module 318 examines the quantized difference codes to determine if the codes may be represented by a reduced number of bits. In particular, bitplane/packing module 318 ascertains whether only a subset of the available quantized difference codes are present within a selected block. If only a reduced subset of the codes are present, then bitplane/packing module may be able to represent the reduced subset codes in fewer bits. For example, if only two of a set of four 2-bit quantized difference codes are present in a selected block, then bitplane/packing module 318 may represent each of the two codes present with a single bit. This process is discussed further hereinbelow.

Figure 4:
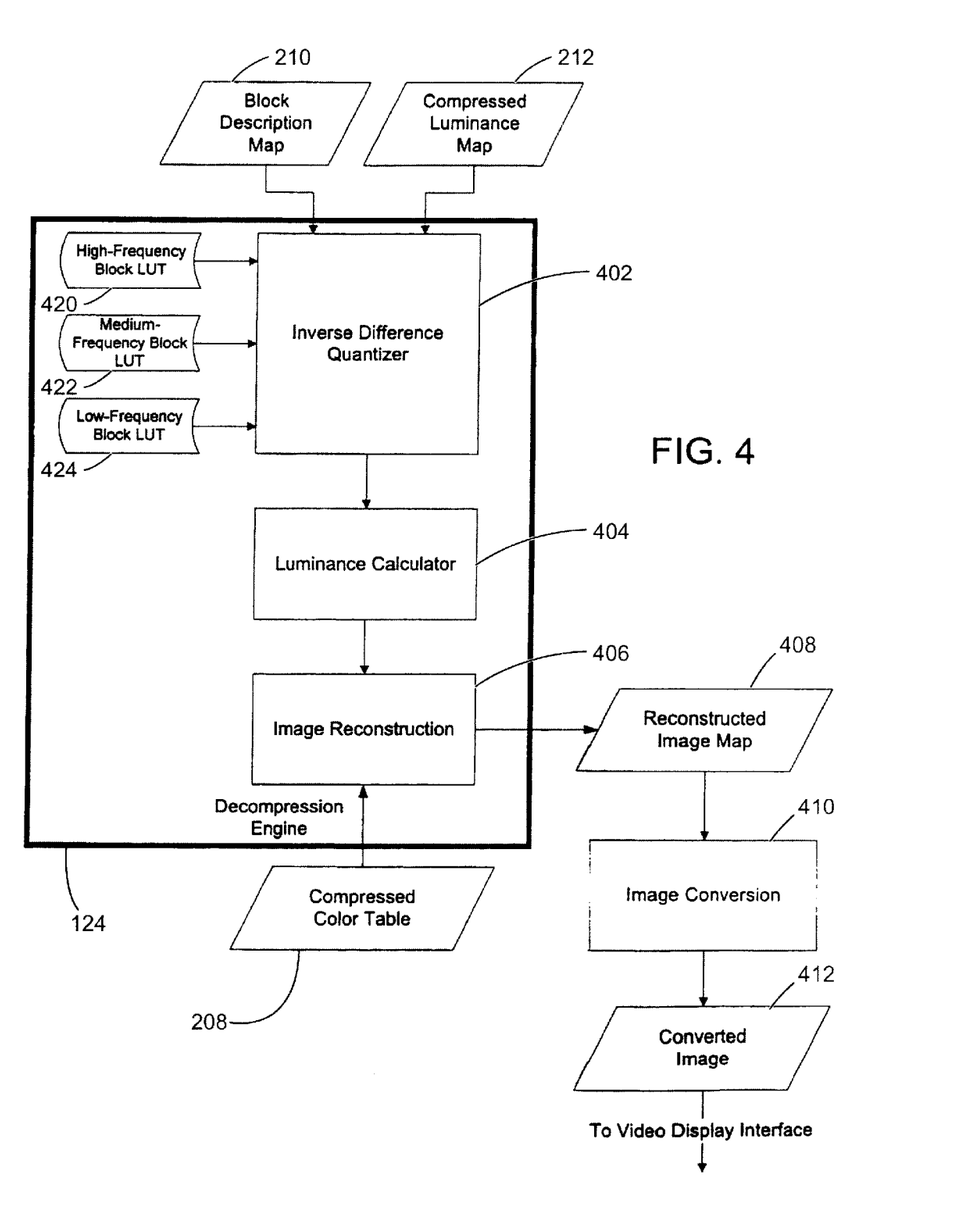
FIG. 4 is a schematic diagram of a decompression engine, in accordance with the present invention.

FIG. 4 is a schematic depiction of decompression engine 124. Decompression engine 124 is seen to include an inverse difference quantizer 402, a luminance calculator 404, an image reconstruction module 406, and LUTs 420, 422 and 424. Inverse difference quantizer 402 receives block description and quantized difference code data from block description map 210 and compressed luminance map 212, and determines, for each pixel, a quantized difference value based on the pixel's quantized difference code and the block frequency characteristic. In the preferred embodiment, inverse difference quantizer 402 determines the quantized difference value by examining the LUT 420, 422, or 424 corresponding to the frequency characteristic of the selected block. LUTs 420, 422, and 424, which respectively represent the high, medium and low values of the block frequency characteristic, each list all quantized difference codes and the corresponding quantized difference values for the associated frequency characteristic.

Luminance calculator 404 calculates a recovered luminance for each pixel based on the quantized difference value and the previously calculated luminances of adjacent pixels. The operation of luminance calculator 404 is discussed in greater detail below in connection with the FIG. 9 flowchart.

Image reconstruction module 406 is operative to combine the recovered luminance data with the compressed chrominance data 208 to generate video image 408. Image reconstruction module 406 embodies one of a number of well-known prior art techniques which need not be described herein. Finally, optional color space conversion module 410 converts the decompressed pixel data (using conventional methods) to a converted image 412 with pixel data in a color space, such as RGB, required by video display interface 106.

Figure 5:
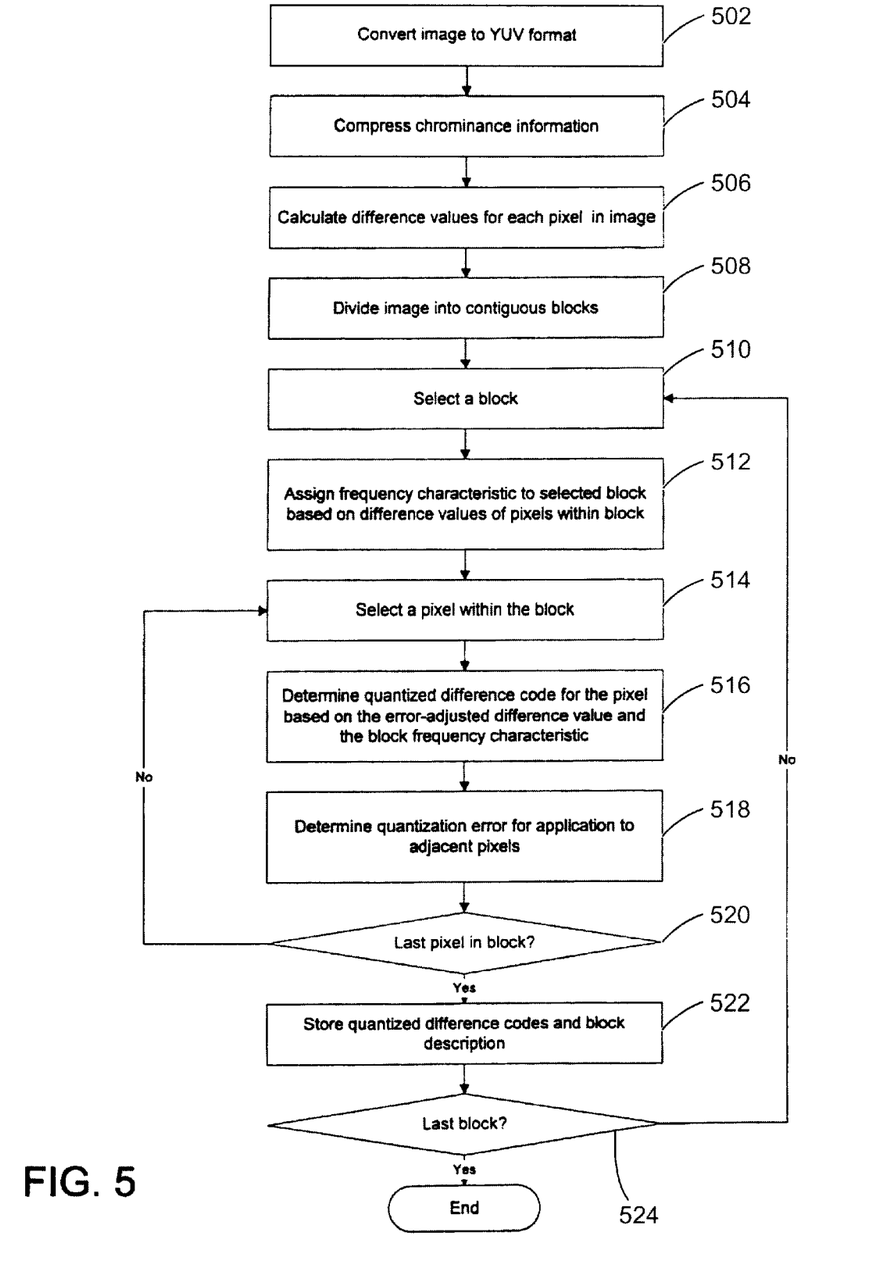
FIG. 5 is a flowchart showing the steps of a method for compressing a video image, in accordance with the present invention.

The compression method of the present invention may be best understood with reference to the FIG. 5 flowchart. In initial step 502, color space conversion module 202 converts video image 120 from a first pixel format, typically RGB, to a YUV or similar pixel format wherein each pixel is represented by a luminance value and two chrominance values. Conversion from RGB color space to YUV color space may be effected by well-known matrixing techniques. Of course, if the pixels of video image 120 are already encoded in YUV format, no conversion is necessary and step 502 is omitted.

In step 504, chrominance compression engine 204 compresses the image chrominance data using a conventional color compression algorithm, such as a color subsampling technique. Various color subsampling techniques are well known in the image compression art and thus need not be discussed in detail herein.

Figure 6:
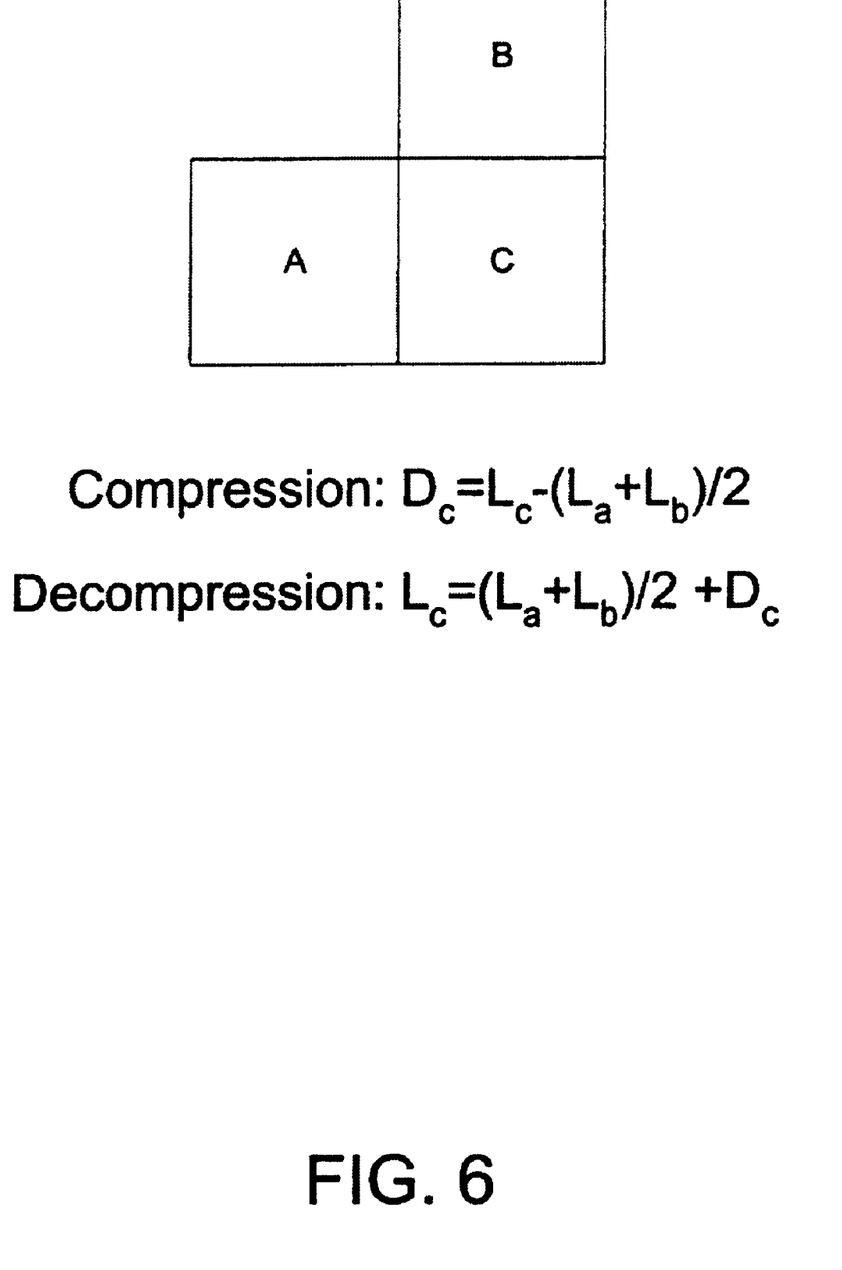
FIG. 6 depicts an arrangement of adjacent pixels and the associated compression and decompression equations.

In step 506, difference calculator 304 calculates, for each pixel in video image 120, a difference between an actual luminance and a predicted luminance. Generally, the predicted luminance is based on averaging the luminances of adjacent pixels. FIG. 6 depicts a method for calculating the difference between the actual luminance and the predicted luminance according to a preferred implementation of the invention. The difference for pixel C, $D_C$, is calculated by averaging the luminances of the leftwardly adjacent and upwardly adjacent pixels ($L_A$ and $L_B$, respectively), and subtracting the average $((L_A+L_B)/2)$ from the actual luminance of pixel C, $L_C$. In equation form, $D_C=L_C-(L_A+L_B)/2$. In the preferred mode of the invention, difference calculator 304 begins with the top-most row of pixels, and proceeds downwardly until difference calculations are completed for the bottom-most row of pixels. Within each pixel row, difference calculator 304 proceeds from left to right. The difference calculator thus initiates its calculations on the upper left corner pixel of the image and completes its calculations on the lower right corner pixel. The calculated differences may be stored in difference table 306.

It is noted that certain of the pixels in image 120, namely the topmost row and leftmost column of pixels, do not have pixels located upwardly and/or downwardly adjacent thereto. In these cases the difference equation is reduced to $D_C=L_C-L_A$ for the pixels in the topmost row, and $D_C=L_C-L_B$ for the pixels in the leftmost column.

Figure 7:
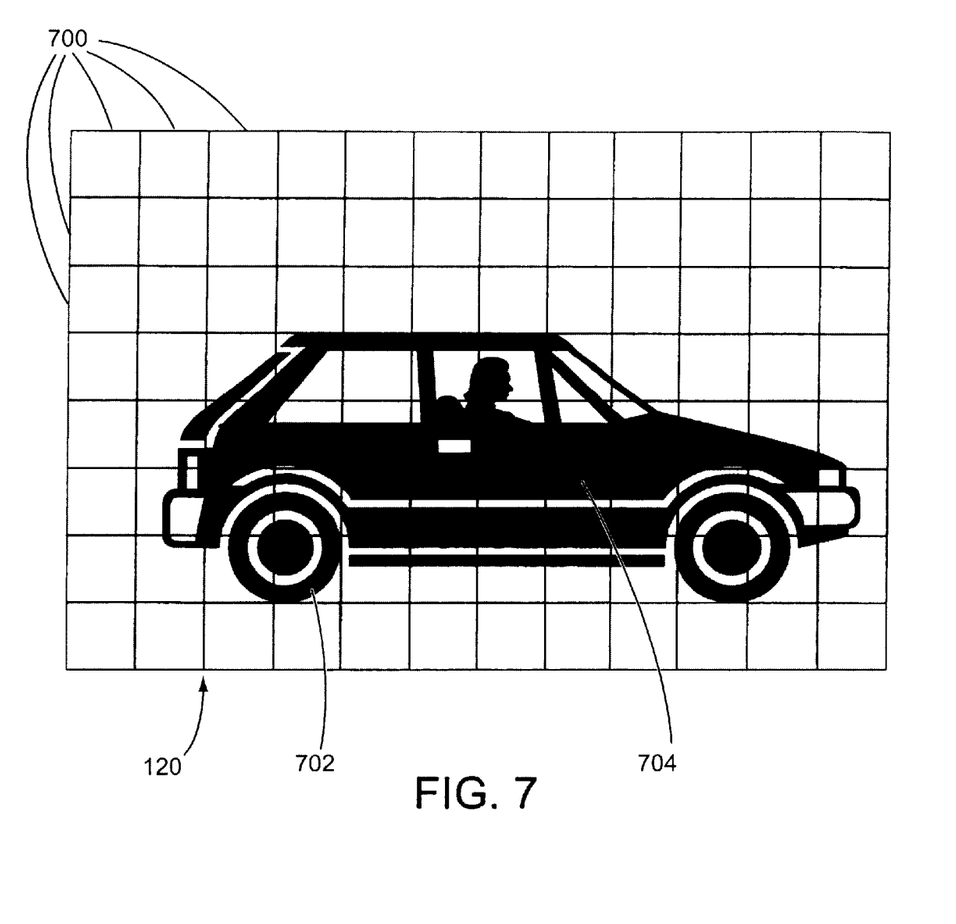
FIG. 7 depicts an exemplary video image divided into an array of contiguous blocks.

In step 508, the image is divided into an array of contiguous blocks. Division of image 120 into an array of blocks is illustrated by FIG. 7. While a relatively small number of blocks (collectively denoted as 700) are depicted in FIG. 7 for the purpose of clarity, a typical implementation of the invention will divide image 120 into several hundreds or thousands of blocks. According to a preferred embodiment, each block 700 will comprise an 8-by-8 rectilinear array of pixels.

Next, a block 700 is selected, step 510. In a preferred implementation, luminance compression module 206 processes the blocks in a rightwardly and downwardly sequence similar to the sequence in which difference calculator 304 calculates pixel differences. Thus, the block 700 in the upper left corner of video image 120 is initially selected.

In step 512, block characterization module 308 assigns a frequency characteristic to the selected block 700 based on the magnitudes of the differences of the pixels within the block 700. In a preferred implementation, block characterization module 308 calculates a difference magnitude M for a given block by summing the squares of the differences of each pixel. In equation form:

$$M = \sum_{i=1}^{n} D_i^2$$

where n is the number of pixels within a block 700 (64 in the preferred implementation), and Di is the difference for pixel i.

The frequency characteristic is then assigned based on the value of M. In the preferred implementation, the block is assigned a frequency characteristic of low if M is less than a predetermined value $M_1$, a frequency characteristic of medium if M falls within the range $M_1 \leq M \leq M_2$, (where $M_2$ is a second predetermined value greater than $M_1$), or a frequency characteristic of high if M is greater than $M_2$. It is noted that, although three values of the frequency characteristic are used in the preferred implementation, the invention may be implemented using a lesser or greater number of frequency characteristic values. It is further noted that the values of $M_1$ and $M_2$ may be optimized for a particular application.

The value of the frequency characteristic for a given block 700 is indicative of whether the portion of image 120 within the block 700 is largely continuous, or whether it contains discontinuous features such as sharp edges or lines. Referring to FIG. 6, block 702 of image 120 would likely be assigned a frequency characteristic of high since it contains several sharp edges, whereas block 704 would be assigned a frequency characteristic of low, since the image portion therein is devoid of discontinuities.

Next, difference quantizer 310 selects a pixel in the block 700 (again proceeding from left to right and from top to bottom within the block), step 514. Difference quantizer 310 then determines a quantized difference code for the pixel based on an error adjusted difference value and the block frequency characteristic, step 518. This step involves first adjusting the difference value of the pixel to compensate for quantization errors associated with the upwardly and leftwardly adjacent pixels, in a manner discussed below.

As discussed hereinabove in connection with FIG. 3, each of the values of the frequency characteristic (high, medium or low) has a set of quantized difference values associated therewith. In a preferred implementation, each frequency characteristic value has four associated quantized difference values. The quantized difference values associated with the frequency characteristic value of high will be relatively greater than the quantized difference values associated with the frequency characteristic value of medium, and so on. For example, the frequency characteristic value of high may be assigned the quantized difference values −64, −8, +8 and +64, the value of medium may be assigned the quantized difference values −32, −4, +4, and +32, and the frequency characteristic value of low be assigned the quantized difference values −16, −2, +2, and +16. Each sequence of quantized difference values may be represented by a corresponding set of 2-bit quantized difference codes, e.g., 00, 01, 10, and 11.

Difference quantizer 310 is operative to select the quantized difference value, from the set of quantized difference values corresponding to the frequency characteristic assigned to the block in which the selected pixel is located, which is closest in value to the difference of the pixel. For example, a pixel located in a block 700 having a medium frequency characteristic may have a difference value of +12. Difference quantizer would then determine that the closest difference quantized value is +4. Matching of the difference to the quantized difference value is preferably effected through the use of LUTs 312, 314 and 316. As discussed above, each LUT 312, 314 and 316 lists all possible values of the pixel difference and the corresponding quantized difference code for each difference value. Utilization of LUTs 312, 314 and 316 advantageously minimizes processing cycles required for this operation.

Figure 8A:
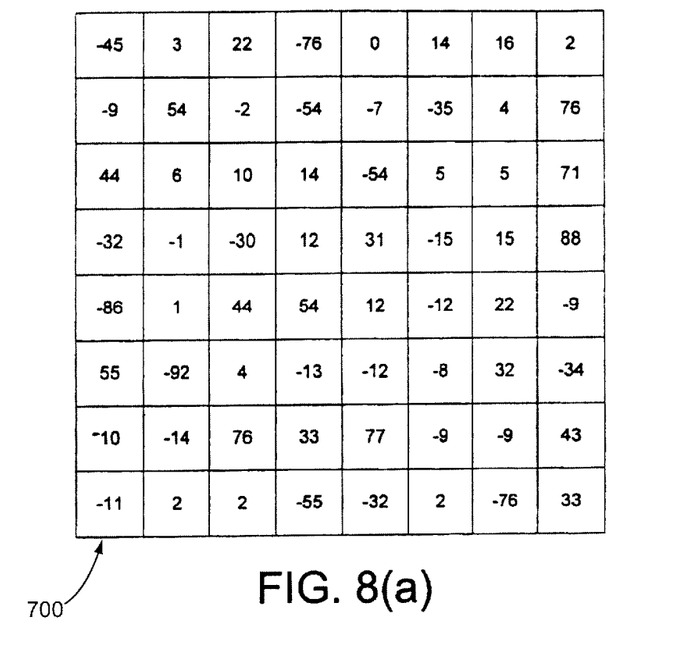
FIG. 8(a) depicts exemplary difference values stored in tabular form.
Figure 8B:
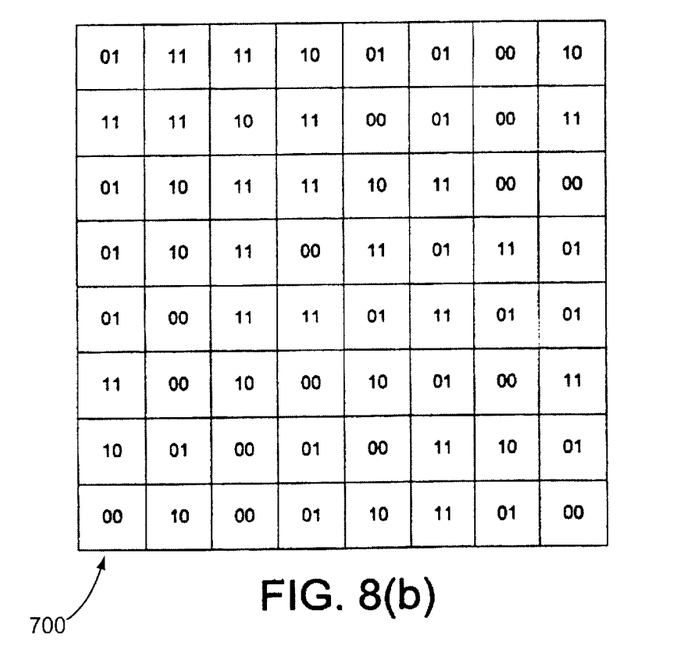
FIG. 8(b) depicts exemplary quantized difference codes stored in tabular form.

FIG. 8(a) depicts a set of exemplary difference values of an 8-by-8 pixel block 700. Typically, the difference values will comprise signed 8-bit integers. FIG. 8(b) depicts an exemplary set of quantized difference codes of another 8-by-8 pixel block following application of the quantization process. Each quantized difference code will typically comprise 2 bits, thereby significantly reducing the amount of memory required to store the pixel luminance information.

In step 518, difference quantizer 310 determines a quantization error and stores the quantization error in a buffer for application to adjacent pixels. The quantization error is equal to the actual difference value minus the quantized difference value. The error is then added to the difference of adjacent pixels. Using the example set forth above, a pixel lying in a medium frequency characteristic block having a difference value of +12 will be assigned a quantized difference of +4. The resultant quantization error would be 12−4=+8. This value is then added to the difference values of the rightwardly and downwardly adjacent pixels stored in difference table 306.

In step 520, it is determined if the selected pixel is the last pixel in the block 700 (i.e., the pixel in the right lower corner of the block 700). If the selected pixel is not the last pixel in the block 700, the method returns to step 514 and difference quantizer 310 selects the next pixel in the block, utilizing the rightward and downward sequence described above.

If it is determined in step 520 that the selected pixel is the last pixel in the block 700, bitplane/packing module 318 proceeds in step 522 to save the pixel quantized difference codes in compressed luminance map 212 and the block frequency characteristic in block description map 210. Those skilled in the art will recognize that either a bitmap plane or packed pixel technique may be employed. Bitplane/packing module 318 may be further configured to examine the quantized difference codes assigned to a particular block 700 to determine if a reduced set of codes may be utilized to represent the quantized differences. For example, bitplane/packing module 318 may determine that the pixels of a selected block 700 are represented by only two of the four available quantized difference codes. In this situation, it is possible to represent the two quantized codes by a single bit, thereby reducing the memory required to store the associated quantized difference code map.

In step 524, difference quantizer 310 determines if the selected block 700 is the last block of video image 120. If the selected block is the last (lowermost, rightmost) block, then the method ends. If not, the method loops back to step 510, and the next block 700 is selected, using the rightward and downward sequence described above.

Figure 9:
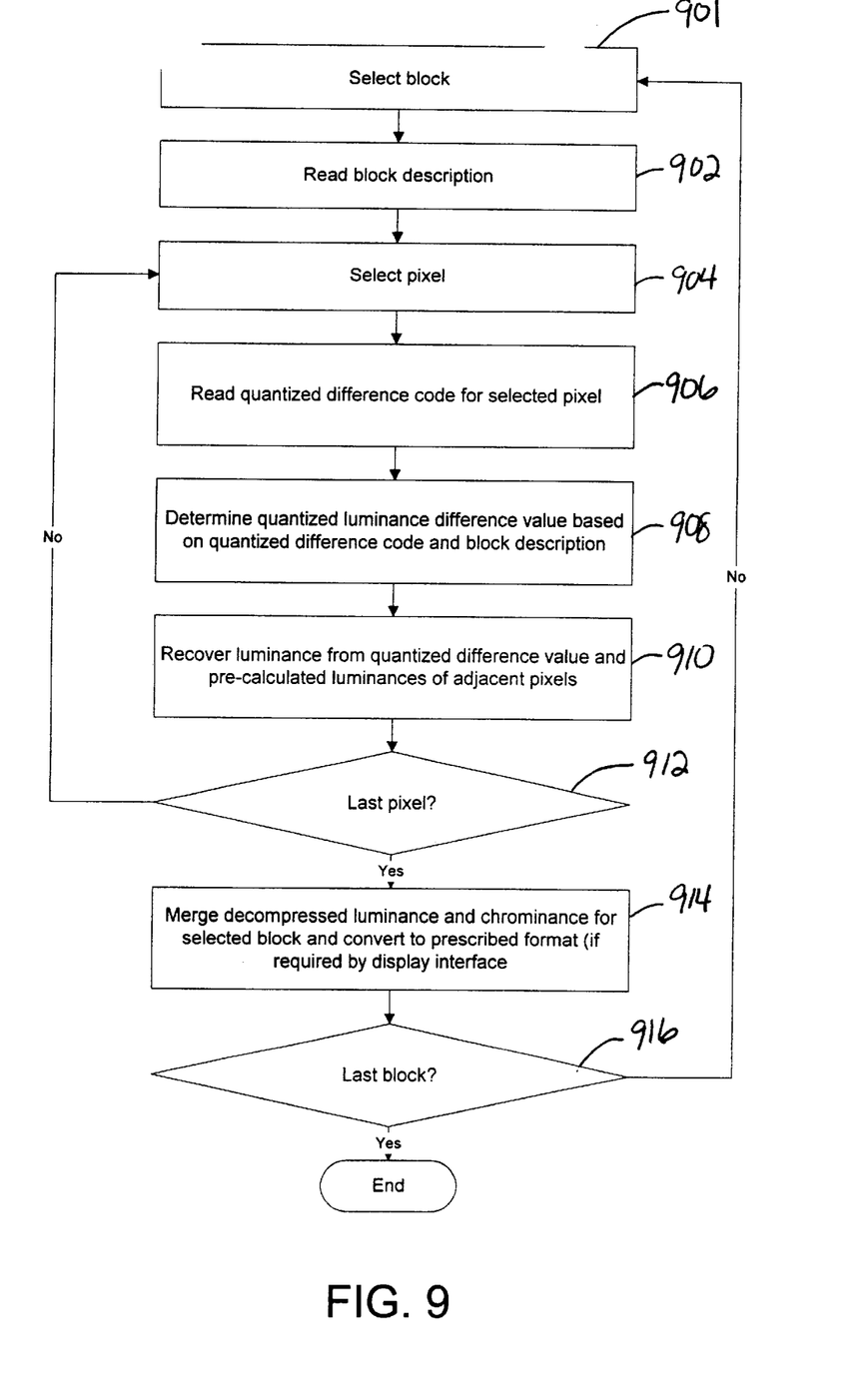
FIG. 9 is a flowchart showing the steps for decompressing a video image, in accordance with the present invention.

FIG. 9 shows the steps of a preferred method for decompressing a video image 120 compressed in accordance with the compression method illustrated by FIG. 5. In the first step 901, inverse difference quantizer 402 selects a block 700 for processing. Preferably, inverse difference quantizer employs a rightward and downward sequence for selecting the blocks, initially selecting the block located in the uppermost, leftmost portion of video image 120. Next, inverse difference quantizer 402 reads the block description of the selected block 700 from block description map 210, step 902. The block description will include a block frequency characteristic value, and may additionally include a one-bit code indicative of whether a reduced set of quantized difference codes has been utilized to represent the pixel luminance data.

In step 904, inverse difference quantizer 402 selects a pixel in the selected block 700, again using a rightward and downward sequence. Next, inverse difference quantizer 402 reads the quantized difference code corresponding to the selected pixel, step 906. The quantized difference value is then determined, step 908, based on the quantized difference code and the block frequency characteristic. In accordance with the exemplary quantized difference codes and quantized difference values set forth above, a quantized difference code of 01 in a medium frequency characteristic block may yield a resultant quantized difference value of −4. Step 908 is preferably effected through examining the appropriate LUT 420, 422, or 424.

Next, luminance calculator 404 calculates a recovered pixel luminance from the determined quantized difference value and the pre-calculated recovered luminances of adjacent pixels, step 910. Referring back to FIG. 6, the recovered luminance of selected pixel C is calculated by averaging the pre-calculated recovered luminances of leftwardly and upwardly adjacent pixels A and B, and adding the quantized difference value. In equation form: $L_C=(L_A+L_B)/2+D_C$, where $L_A$, $L_B$, and $L_C$ are the recovered luminances of pixels A, B and C, and $D_C$ is the quantized difference value for pixel C. It is noted that pixels located in the upper row and leftmost column of video image 120 will not have upwardly and/or leftwardly adjacent pixels, so a recovered luminance value(s) must be assumed for the non-existent adjacent pixel(s)

Returning to FIG. 9, inverse difference quantizer 402 determines if the selected pixel is the last pixel in the block 700, step 912. If not, the method loops back to step 904, and inverse difference quantizer 402 selects the next pixel in the block 700. If the selected pixel is the last pixel in the block 700, then the recovered luminance data is merged with recovered chrominance data from compressed chrominance map 208 in accordance with well known prior art techniques, step 914. The merged luminance and chrominance data for the selected block is stored in reconstructed image map 408.

In step 916, inverse difference quantizer 402 determines if the selected block 700 is the last block of video image 120. If so, the method ends. If not, the method loops back to step 901 and the next block 700 is selected.

The invention has been described above with reference to a preferred embodiment. It will be apparent to those skilled in the art that various modifications may be made and other embodiments can be used without departing from the broader scope of the invention. Therefore, these and other variations upon the preferred embodiment are intended to be covered by the present invention, which is limited only the appended claims.

What is claimed is:

1. A method of compressing a video image comprising a two-dimensional array of pixels, the image being divided into an array of contiguous blocks, the method comprising the steps of:

calculating, for each pixel within a block, a difference between a predicted luminance and an actual luminance;

assigning a frequency characteristic to the block based on a magnitude of the differences of the pixels within the block;

determining, for each pixel within the block, a quantized difference code based on the calculated difference and the assigned frequency characteristic; and storing the frequency characteristic of the block and the quantized difference codes for each pixel within the block; and wherein the step of assigning comprises calculating a sum of the squares of the differences of all pixels within the block, and selecting the frequency characteristic from a set of predetermined frequency characteristics based on the calculated sum.

2. The method of claim 1, wherein the predicted luminance is calculated by averaging actual luminances of adjacent pixels.

3. The method of claim 1, wherein the adjacent pixels comprise a leftwardly and an upwardly adjacent pixel.

4. The method of claim 1, wherein the step of determining a quantized difference code comprises matching the difference to a closest one of a set of quantized difference values associated with the assigned frequency characteristic, and selecting the quantized difference code corresponding to the matched quantized difference value.

5. The method of claim 4, wherein the step of determining a quantized difference code includes adjusting the difference to compensate for matching errors associated with one or more adjacent pixels.

6. The method of claim 4, wherein the step of determining a quantized difference code includes examining a lookup table associated with the assigned frequency characteristic.

7. The method of claim 1, wherein the step of storing the quantized difference codes includes the step of packing the quantized difference codes into a bitplane.

8. The method of claim 1, wherein the step of storing the quantized difference codes includes determining whether the quantized difference codes of the selected block can be represented by a reduced set of quantized difference codes.

9. An apparatus for compressing a video image comprising an array of contiguous blocks, comprising:

a difference calculator for calculating, for each pixel within a selected block, a difference between a predicted luminance and an actual luminance;

a block characterization module for assigning a frequency characteristic to the block based on a magnitude of the differences of the pixels within the block;

a difference quantizer for determining, for each pixel within the block, a quantized difference code based on the calculated difference and the frequency characteristic;

a block description map for storing the frequency characteristic of the block; and a compressed luminance map for storing the quantized difference codes for each pixel within the block; and wherein the block characterization module is configured to calculate a sum of the squares of the differences of all pixels within the block, and select the frequency characteristic from a set of predetermined frequency characteristics based on the calculated sum.

10. The apparatus of claim 9, wherein the predicted luminance is calculated by averaging actual luminances of adjacent pixels.

11. The apparatus of claim 9, wherein the adjacent pixels comprise a leftwardly and an upwardly adjacent pixel.

12. The apparatus of claim 9, wherein the difference quantizer is configured to determine the difference code by matching the difference to a closest one of a set of quantized difference values associated with the assigned frequency characteristic, and selecting the quantized difference code corresponding to the matched quantized difference value.

13. The apparatus of claim 12, wherein the difference quantizer is configured to adjust the difference to compensate for matching errors associated with one or more adjacent pixels.

14. The apparatus of claim 12, wherein the difference quantizer is configured to extract the quantized difference code from a lookup table associated with the assigned frequency characteristic.

15. The apparatus of claim 9, further comprising a chrominance compression module for compressing chrominance data associated with each of the pixels of the image, and a compressed chrominance map for storing the compressed chrominance data.

16. A computer-readable medium comprising program instructions for compressing a video image divided into an array of contiguous blocks by performing the steps of:

calculating, for each pixel within a block, a difference between a predicted luminance and an actual luminance;

assigning a frequency characteristic to the block based on a magnitude of the differences of the pixels within the block;

determining, for each pixel within the block, a quantized difference code based on the calculated difference and the assigned frequency characteristic; and storing the frequency characteristic of the block and the quantized difference codes for each pixel within the block; and wherein the step of assigning comprises calculating a sum of the squares of the differences of all pixels within the block, and selecting the frequency characteristic from a set of predetermined frequency characteristics based on the calculated sum.

* * * * *